(12) United States Patent
Dellanno (10) Patent No.: US 7,090,292 B2
(45) Date of Patent: Aug. 15, 2006

(54) ENERGY ABSORBING SUPPORT FOR VEHICULAR PASSENGERS

(76) Inventor: Ronald P. Dellanno, 40 Fox Run, North Caldwell, NJ (US) 07006

( * ) Notice: Subject to any disclaimer, the term of this patent is extended or adjusted under 35 U.S.C. 154(b) by 0 days.

(21) Appl. No.: 10/855,986

(22) Filed: May 27, 2004

(65) Prior Publication Data

US 2005/0264052 A1 Dec. 1, 2005

(51) Int. Cl.
*B60N 2/42* (2006.01)
(52) U.S. Cl. .......................... 297/216.12; 297/452.37; 297/216.13
(58) Field of Classification Search ........... 297/216.12, 297/216.13, 216.14, DIG. 3, 452.41, 452.55, 297/452.57, 452.65, 452.37, 391; 5/653, 5/655.9, 953, 636
See application file for complete search history.

(56) References Cited

U.S. PATENT DOCUMENTS

| | | | |
|---|---|---|---|
| 3,205,005 A | 9/1965 | Brown | |
| 5,181,763 A | 1/1993 | Dellanno et al. | |
| 5,290,091 A | 3/1994 | Dellanno et al. | |
| 5,529,377 A | 6/1996 | Miller | |
| 5,558,398 A | 9/1996 | Santos | |
| 5,669,661 A | 9/1997 | Pajon | |
| 5,676,421 A * | 10/1997 | Brodsky | 297/216.13 |
| 5,678,891 A | 10/1997 | O'Neill et al. | |
| 5,769,489 A * | 6/1998 | Dellanno | 297/216.14 |
| 5,772,280 A * | 6/1998 | Massara | 297/216.12 |
| 5,902,010 A * | 5/1999 | Cuevas | 297/216.13 |
| 5,927,804 A * | 7/1999 | Cuevas | 297/216.12 |
| 5,961,182 A | 10/1999 | Dellanno | |
| 6,142,563 A * | 11/2000 | Townsend et al. | 297/216.1 |
| 6,273,511 B1* | 8/2001 | Wieclawski | 297/463.1 |
| 6,390,549 B1* | 5/2002 | Mayer et al. | 297/216.14 |

* cited by examiner

*Primary Examiner*—Peter R. Brown
(74) *Attorney, Agent, or Firm*—Klauber & Jackson

(57) ABSTRACT

Apparatus for preventing or limiting spinal injuries to a passenger seated in a forward facing position in a moving vehicle during vehicular impact or sudden deceleration. The apparatus includes a vehicle-installed supporting seat for the passenger, the seat having a support portion behind the seated passenger which includes a resilient surface in contact with the supported passenger. The resilient portion is supported on an underlying stiff support shell. A controllably deformable energy absorbing crush zone is disposed to the rear of the shell as to be compressed by rearward displacement of the passenger, whereby the support portion acts to decelerate the supported spine of the passenger during a vehicle rear end impact, while the controlled deformation of the crush zone absorbs energy, to prevent or limit spinal injuries to the passenger. The crush zone material is characterized in a rear end collision by exhibiting a total energy absorption of the kinetic energy gained by the impact accelerated passenger of at least 80%; and the coefficient of restitution for the crush zone material being in the range of 0.05 to 0.4.

9 Claims, 4 Drawing Sheets

ENERGY ABSORBING SUPPORT FOR VEHICULAR PASSENGERS

FIELD OF THE INVENTION

This invention relates generally to seating, and more specifically relates to seating apparatus for use in vehicles, which includes means which so interact with a seated passenger that the kinetic energy of the passenger is absorbed during sudden vehicle acceleration. In consequence, preservation of spinal curves and posture is accomplished so that whiplash related injury to the passenger's cranium, cervical, thoracic, and/or lumbar spine is prevented or minimized.

BACKGROUND OF INVENTION

In the mid 1950s, padded head restraints added to the top of car seats were proposed to reduce injuries incurred during rear-end collisions. Investigators at that time suggested that the primary mechanism of injury in rear-end impacts was hyperextension of the head on the cervical spine. This theory was accepted and acted upon. The National Highway Traffic Safety Administration made it a requirement for all cars made in the United States to have head restraints. Federal Motor Vehicle Safety Standard 202 made this official in 1969, and it has remained unchanged.

In the mid 1990s, several automotive manufacturers attempted to develop more efficient designs that are higher and closer to the back of the head. This was done to prevent hyperextension of the head and neck to conform to what was believed to be a good head restraint position. However, in an accident analysis study conducted by the Transport Research Laboratory, Berkshire, United Kingdom, and the University of Manchester, Hope Hospital, Manchester, United Kingdom, the benefits of good head restraint positioning could not be clearly demonstrated. The data in rear-end collisions, where the benefits of a well-positioned head restraint should have been clear, indicated that a larger distance from head to restraint was associated with lower disability. This study suggests that other injury mechanisms are at work during whiplash.

Certain faulty premises continue to exist regarding rear-end, low-speed collisions. One of these is that whiplash injury is caused by a typical hyperextension movement of the head and neck. In the normal extension movement, the head rotates on the vertebra below C1, C1 rotates over the instantaneous axis of rotation of C2, and then C2 rotates on the C3 instantaneous axis of rotation, and so on until the entire cervical spine completes its full extension motion. In rear-end collisions, this pattern of extension motion does not occur; rather, a completely unnatural motion is observed when high-speed x-ray is used to observe human aberrant spinal kinematic motion. These studies observe axial loading from thoracic spine straightening, causing impaction of the cervical facet plates above and, then, hyperextension of the lower cervical vertebrae rotating and compressing each vertebra from under the vertebra above. This is initiated by the seat back, which is sweeping the lower portion of the neck under the upper portion of the neck. This results in an abnormal double harmonic curve in the cervical spine often referred to as the dreaded "S" curve.

Investigation contributed to the understanding of injury mechanism by identifying the zygapophyseal joint as the source of pain in 54% of patients with chronic neck pain after whiplash injury. With the zygapophyseal joint identified as the primary injury site, the next development was observation of what happened to these cervical joints during the rear-end impact event on human volunteers. This was accomplished with cineradiography, which showed significant aberration in motion during rear-end impact, resulting in facet plate collision and impingement. Increased shear force and extension motion to the lower cervical vertebra was observed while the upper portion of the cervical spine followed the head into flexion, giving the formation of an "S" curve. The transition area of the S curve was at the level of C4, C5, and C6, the most common injury sites observed in a whiplash victim in postaccident x-ray analysis.

Many variables can influence the forces to the spine that can cause injury: the size of the vehicles, the size of the occupants, and the speeds of the vehicles. Attempting to prevent whiplash injury thus can be a daunting task. However, reducing the global movement of the entire spine and the relative movement of each vertebra appear to be the most practical approach in the prevention of injury to the spine. To accomplish this, all spinal curves should be supported and decelerated at as close to a zero delta velocity as possible. This requires support systems within head-neck restraints and seats that are contoured to the spine to reduce the spinal straightening observed during rear end impact. Additionally, the head-neck restraint and seat back should have complementary dampening characteristics so that simultaneous deceleration of the head, neck, thoracic, and lumbopelvic areas can be achieved.

It may be noted in the last connection, that the construction of most prior art seatbacks and head restraints incorporate materials that in an effort to provide maximum comfort, are highly resilient. Such materials while they may absorb some of the impact energy which is generated as the passenger is thrown rearwardly against the seat during a rear end impact, promptly transfer the absorbed energy back to the passenger, causing a rebound effect, which only adds to the detrimental conditions which foster injury.

In accordance with the foregoing, it may be regarded as an object of the present invention, to overcome the problems and disadvantages of known apparatus for preventing whiplash, such as vehicle head restraints and seatbacks.

It is a further object of the present invention, to provide apparatus of the foregoing type, which includes means for efficiently and safely absorbing impact energy, thereby further diminishing the likelihood of passenger injury.

In my issued U.S. Pat. Nos. 5,181,763 and 5,290,091, the entire disclosures of which are hereby incorporated by reference, apparatus is disclosed for preventing whiplash-related injuries to a passenger in a vehicle. The characteristic shapes of the devices shown therein define a supporting means and contour located behind the cranium and cervical spine of the passenger that interfit with the posterior contour of the passenger's cranium and cervical spine. The supporting means interacts with the passenger during rear end impact to maintain the pre-collision shape of the supported spinal curves, to thereby aid in the avoidance of whiplash and similar injuries.

In my further issued U.S. Pat. No. 5,580,124 (the entire disclosure of which is hereby incorporated by reference) there is disclosed a vehicle-installed supporting seat for a passenger, which includes a seat back provided with an integral head-neck restraint comprising a cranium support portion and a cervical spine support portion. Each said portion includes a layer of resilient material supported on an underlying inflexible support shell, which together act to effectively define a contour that interfits with the posterior contour of the passenger's cranium and cervical spine. The support shell is rearwardly displaceable upon being subjected to impressed forces generated from the passenger pressing against the restraint as a result of a rear end impact at said vehicle. A controllably deformable energy absorbing crush zone is disposed to the rear of the shell as to be compressed by the rearward displacement of the shell. The interfitting contour and thereby the inflexible shell, upon being displaced by said forces toward the underlying crush zone, retain the shape of the contour, whereby the cervical and cranium support portions act to substantially simultaneously decelerate the cranium and cervical spine of the passenger during a vehicle rear end impact, while the controlled deformation of the crush zone absorbs energy, to prevent whiplash-related injuries to the passenger.

The apparatus of the U.S. Pat. No. 5,580,124 patent preferably further includes a thoracic and lumbar spine support portion which are defined by downward extension of the support shell, resilient material and contour; whereby the thoracic and lumbar spine portion of the passenger are decelerated with the cranium and cervical spine during a rear end impact.

The thoracic section of the human spine is believed to be compressed and flattened during a rear end impact. In addition to being injured, this flattening of the thoracic spine causes axial loading into the cervical spine as the weight of the head and upward pressure of the flattening thoracic spine serve as end point forces to damage the cervical spine. Where present, the thoracic portion of the above seat serves to prevent the flattening of the thoracic spine by having a kyphotic or concave firm contoured shell that takes the shape of the human thoracic spine and maintains this shape during rear end impact. This firm contoured shell precedes the crush zone material which plastically deforms and produces a controlled damping of the forces incurred during a rear end collision.

The lumbar section of the seat will conform to the lumbar spinal curves of the human anatomy. The initial foam that contacts the occupants is combined with the crush zone feature to maximize the energy absorbing feature of this technology.

This firm contoured shell will hold its form on impact from the rear end collision. This contoured shell will then plastically deform the crush zone material. The function of the crush zone, whatever materials are used, is to initiate a controlled damping of forces that result in little or no rebound energy to the occupant.

The crush zone may comprise one or more air bladders, and valve means responsive to rear end vehicular impact to enable the one or more bladders to at least partially deflate. The inflexible shell can, for example, be linked to one or more mechanical actuators which open the valves upon a predetermined displacement of the shell; or one or more sensors can upon detecting a rear end impact, actuate the valves to enable controlled deflation of the air bladders.

Similarly, one or more rear impact sensors can enable control signals upon an impact of sufficient magnitude, which signal disables a restraint means, e.g. by releasing a mechanical stop which otherwise prevents displacement of the inflexible shell (or of a plate linked to the shell) against or into the crush zone.

In another aspect of the U.S. Pat. No. 5,580,124 disclosure, the crush zone can comprise an impact collapsible cellular structure, such as a frangible foam. In still a further aspect, the crush zone may comprise an elastically deformable material which absorbs energy at a substantially more rapid rate than it releases same.

The crush zone may be sandwiched between the inflexible shell and a spaced fixed, rigid plate; or the crush zone can be spaced from the rear of the shell and contacted and compressed by an intermediate plate which is linked for displacement with the shell. Rearward displacement of the shell may be resisted by restraining means adapted to collapse at a preset strain.

In my further issued U.S. Pat. No. 5,769,489 it is disclosed that the energy absorbing concepts of my U.S. Pat. No. 5,580,124 patent, can be incorporated into a vehicular passenger support in a manner that will independently or conjunctively protect any or all of the passengers' cranium, cervical, thoracic, and/or lumbar spine. Pursuant to that earlier patent, apparatus is thus provided for preventing or limiting spinal injuries to a passenger seated in a forward facing position in a moving vehicle during vehicular impact or sudden deceleration. The apparatus comprises a vehicle-installed supporting seat for the passenger, the seat having a support portion behind the seated passenger which includes a resilient surface in contact with the supported passenger, the resilient portion being supported on an underlying stiff support shell. The support shell is rearwardly displaceable upon being subjected to impressed forces generated from the passenger pressing against the resilient surface of the support portion as a result of a rear end impact at the vehicle. A controllably deformable energy absorbing crush zone is disposed to the rear of the shell as to be compressed by the rearward displacement of the shell, whereby the support portion acts to decelerate the supported spinal curves of the passenger during a vehicle rear end impact, while the controlled deformation of the crush zone absorbs energy, to prevent or limit spinal injuries to the passenger.

The support portion can be provided at a portion of the seat which lies behind the thoracic spine of a seated passenger, and/or at a portion of the seat that lies behind the lumbar spine of a seated passenger; and/or at a portion of the seat which lies behind the cranium and cervical spine of a seated passenger.

The resilient surface may conform to the shape of the spine of the seated passenger. The surface may be preformed to this shape, or may comprise a foam, gel or other material which molds to the contacting body contour of the passenger upon the passenger being seated, and returns to its original shape when the seat is vacated. Materials of this type made of a high density, visco-elastic open-cell material, are available commercially from Tempur-Pedic of Lexington, Ky., and have been used in pillows and mattresses.

The crush zone may comprises one or more air bladders, and valve means responsive to an impact may function to enable the one or more bladders to at least partially deflate upon vehicular impact. The crush zone may also comprises an impact collapsible cellular structure. In another embodiment the crush zone may comprise an elastically deformable material which absorbs energy at a substantially more rapid rate than it releases same. The crush zone can be sandwiched between the stiff shell and a spaced fixed, rigid plate, or can be spaced from the rear of the shell and contacted and compressed by an intermediate plate which is linked for displacement with the shell. Rearward displacement of the shell can be resisted by restraining means adapted to collapse at a preset strain.

Figure 1:
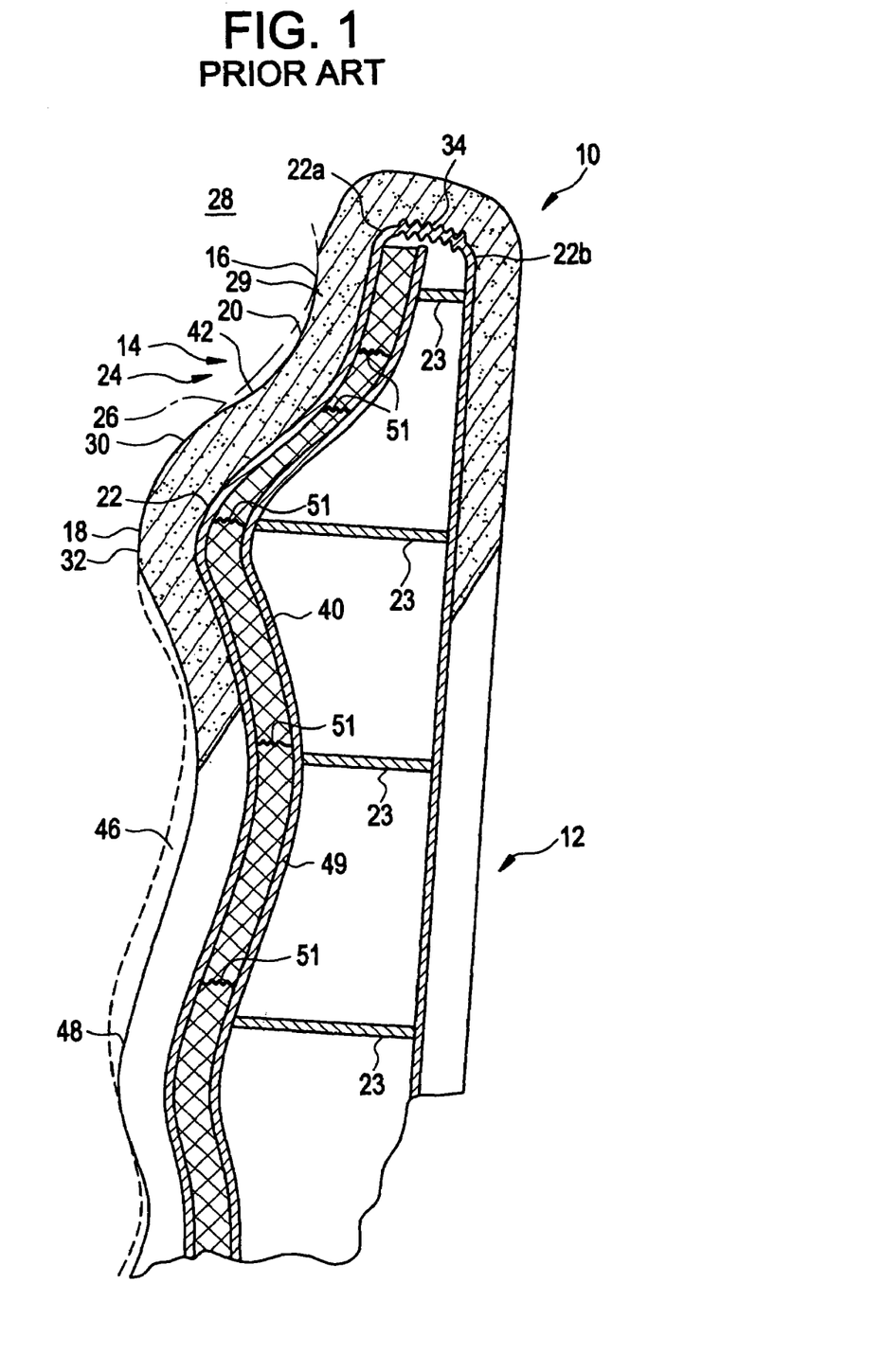
FIG. 1 is a simplified, schematic cross-section illustrating the prior art apparatus disclosed in U.S. Pat. No. 5,580,124.

In FIG. 1, a cross-sectional view, schematic in nature, appears through prior art apparatus 10 in accordance with the disclosure of U.S. Pat. No. 5,580,124. The vehicle-installed supporting seat for the passenger includes a conventional seating area, which is not shown in the drawing. Extending in a vertically upward direction from the seating area is a seat back 12 provided with an integral head-neck restraint 14 comprising a cranium support portion 16 and a cervical spine support portion 18. Each said portion includes a layer of resilient material 20 supported on an underlying inflexible support shell 22. The material 20 and the shell 22 together act to effectively define a contour 24 that interfits with the posterior contour 26 of the passenger 28's cranium and cervical spine. This contour 26 thus presents a first surface 29 located behind the passenger's cranium for contacting the approximate center of mass of the cranium and supporting the approximate central posterior area of the passenger's cranium, and a second surface 30 located below the first surface and defining a substantially convex smooth curve, the maximum protrusion point 32 of which projects anteriorly relative to where the first surface 29 contacts the center of mass of the passenger's cranium, the said second surface 30 thereby contacting and supporting the posterior portion of the passenger's cervical spine substantially simultaneously with the said contact of the passenger's cranium with said first surface.

The support shell 22 may comprise a hard relatively inflexible plastic, or similarly may comprise metal or the like. The shell may also comprise a relatively rigid foam, one which has high stiffness characteristics, so that such material, as with an inflexible plastic, will maintain the spinal contours under impact loading. Shell 22 is rearwardly displaceable upon being subjected to impressed forces generated from the passenger 28 pressing against the restraint as a result of a rear end impact at the vehicle. In the embodiment shown in FIG. 1 this is enabled by having the shell 22 formed as a front piece 22a and a rear piece 22b, the two pieces being interconnected by one or more flexible accordion pleats, the uppermost of which appears at 34.

A controllably deformable energy absorbing crush zone 40 is disposed to the rear of the shell 22 as to be compressed by the rearward displacement of the shell. The interfitting contour 24 and thereby the inflexible shell 22, upon being displaced by said forces toward the underlying crush zone 40, retain the shape of the contour 24, whereby the cervical and cranium support portions act to substantially simultaneously decelerate the cranium and cervical spine of the passenger during a vehicle rear end impact, while the controlled deformation of the crush zone absorbs energy, to prevent whiplash-related injuries to the passenger.

The second surface 30 of contour 24 is smoothly joined to the first surface 29 by a transition surface 33 of said contour, which extends anteriorly at an obtuse angle from said first surface, and which is located to support the passenger's posterior area approximately where the cranium meets the cervical spine. The maximum protrusion point 32 of said second surface 30 projects anteriorly relative to said flat portion of said first surface 29 a distance of 1 to 6 inches, and the maximum protrusion point 32 is from 3 to 9 inches below the cranium contact zone.

The apparatus 10 preferably further includes thoracic and lumbar spine support portions 46 and 48, which are defined by downward extension of the support shell 22, resilient material 20 and contour 24; whereby the thoracic and lumbar spine portions of the passenger 28 are decelerated with the cranium and cervical spine during a rear end impact.

The crush zone 40 may comprise one or more air bladders, and valve means responsive to rear end vehicular impact to enable the one or more bladders to at least partially deflate.

The crush zone 40 can also comprise an impact collapsible cellular structure, such as a frangible foam. The cellular structure can similarly comprise the well known bubble packing, which is commonly used to protect fragile objects during shipping. Other controllably collapsible or deformable materials can be used for crush zone 40, for example frangible ceramic or organic foams, or the like. The important consideration is that any such materials shall collapse or deform under suitable imposed forces in a controllable fashion so that they not only enable controlled rearward displacement of piece 22a, but also absorb energy in doing so. Thus by way of example, it will be clear that the bubble type packing material referred to absorbs energy during collapse as each of the cells is ruptured due to pressure forces. In still a further aspect, the crush zone 40 may comprise an elastically deformable material which absorbs energy at a substantially more rapid rate than it releases same.

The crush zone 40 may as shown in FIG. 1 be sandwiched between the inflexible shell 22 (via piece 22a) and a spaced fixed, rigid plate 49, which is maintained in its position by support members 23 which extend between plate 49 and back piece 22b. Compression springs 51 may be provided between shell 22 and plate 49 to aid in restoring the original spacing following the controlled collapse of the crush zone. In the variation shown in the partial cross section of FIG. 4, the crush zone 40 is placed to the rear of seat back 12. Here the rearward displacement of piece 22a moves plate 49a which is rigidly linked to piece 22a by members 23a.

Figure 2:
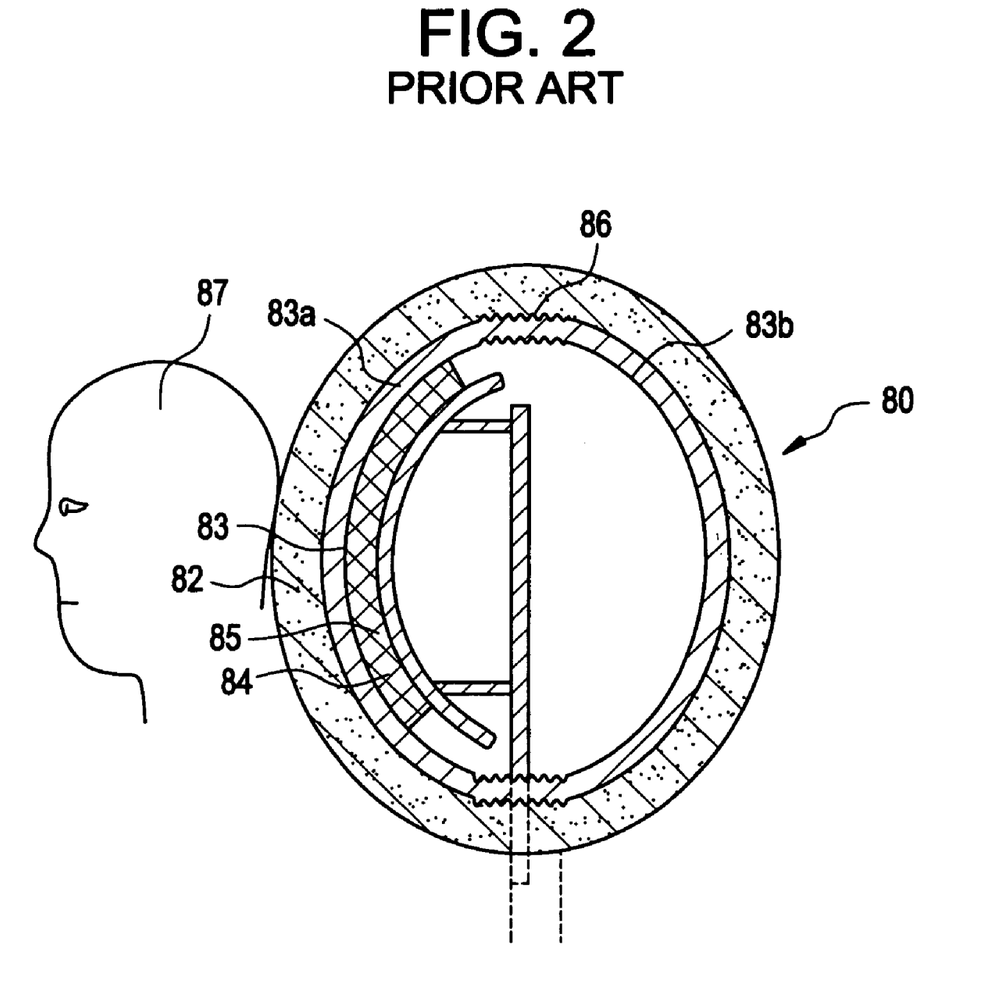
FIG. 2 is a simplified, schematic cross-section illustrating the prior art apparatus disclosed in FIG. 6 of U.S. Pat. No. 5,769,489.

In FIG. 2 a further prior art showing appears which conforms to FIG. 6 in my U.S. Pat. No. 5,769,489 patent. There a conventionally shaped head restraint such as that illustrated can incorporate the principles of the U.S. Pat. No. 5,580,124 patent. Externally head restraint 80 thus has a configuration which is entirely conventional. However the otherwise conventional head restraint is seen to be provided with a resilient support surface 82, an underlying inflexible shell 83, a crush zone 85, and a spaced rigid plate 84, all of which function exactly as has been discussed in connection with the prior embodiments. The shell 83 thus includes the two portions 83a and 83b, with intervening flexible portion 86, whereby upon the passenger's cranium 87 being forced against the head restraint 80 as a result e.g. of a rear end vehicular impact, shell portion 83 is displaced to the left (in the sense of the drawing) against the crush zone 85, which controllably deforms in the manner that has been previously discussed.

Since the head restraint does not have to maintain a specific shape to conform to the passenger's spine, the head restraint can function effectively to limit forces producing head injury, by including merely an outer passenger contacting surface of a foam or other known materials used in the prior art, which surface overlies a controllably collapsible crush zone which the said surface can be displaced against under impact forces. The crush zone can be of the types discussed herein or can comprise other controllably collapsible materials which act to dampen the impressed forces.

SUMMARY OF THE INVENTION

Now in accordance with the present invention, it has been found that certain specific characteristics of the crush zone materials are critical in determining the ultimate efficacy of the energy absorbing supports disclosed and claimed in my aforementioned patents, and that similar principles broadly apply to related energy absorbing vehicle passenger supports. Essentially it has been found that several conditions should be met in order to minimize the possibility of serious injury to a passenger residing on the vehicle support. First it is essential that upon a rear impact at the vehicle, a relatively inflexible surface which approximately conforms to the spine of the seated passenger (herein referred to as the "shaped surface") provides a restraining boundary which maintains the normal curvature of the spine; this despite the fact that the passenger will be subjected to large forces generated by the impact which would otherwise rearwardly accelerate the passenger with respect to the vehicle as a frame of reference. Secondly, the shaped surface must itself be rearwardly displaceable upon rear impact, but at a rate that is slow enough to maintain the restraining force against the seated passenger, while also being rapid enough that the reaction force against the passenger is not excessive. This requires that the rearward displacement of the shaped surface upon impact must be controlled by a mechanism which absorbs and/or dissipates energy from movement of the shaped surface at a rate commensurate with safe displacement of the passenger. Related to this is a third condition, namely that the shaped surface following its rearward displacement not undergo a "recoil" sufficient to throw the passenger in a forward direction, thereby partially or entirely defeating the very purpose of the support.

In order to meet the above conditions it has been found that standardized to the impact conditions of Federal Motor Vehicle Safety Standard (FMVSS) 202, in which a velocity change of approximately 10 mph is achieved using a rear impact sinusoidal acceleration pulse of 80–96 msec with a nominal peak level of between 8.0 and 9.6 g's being imposed at the test subject seated in the struck vehicle; and assuming a passenger weight and height in the $50^{th}$ percentile of standard U.S. adult weight and height data (these being the test conditions used by Johns Hopkins University for testing effects of such collisions on test cadavers and test dummies); the total energy absorbtion by the vehicle passenger restraint (from the kinetic energy transferred from the impact accelerated test subject) should be at least 80%; and that the coefficient of restitution c for the crush zone material should be in the range of 0.05 to 0.4, with a preferable range being from 0.1 to 0.2. A coefficient of restitution of 0 would mean that the energy is completely absorbed, i.e. there is no tendency for the shaped surface to be resilient; and conversely a coefficient of restitution of 1 would indicate in effect that the surface and seated passenger would completely recoil or "bounce" following the initial displacement.

Thus a perfectly elastic collision has a coefficient of restitution of 1—an example being two diamonds bouncing off each other. Conversely a perfectly plastic, or inelastic, collision has c=0. An example of the latter would be two lumps of clay that don't bounce at all, but stick together. So the coefficient of restitution will always be between zero and one.

In quantitative terms the coefficient of restitution c is the ratio of the differences in velocities before and after the collision. In other words, the difference in the velocities of the two colliding objects after the collision, divided by the difference in their velocities before the collision.

In the present invention the shaped surface will typically be covered or overlaid by a conventional "comfort foam" or upholstery batting and an aesthetic covering such as leather, vinyl or fabric. The latter is of course the material which directly contacts the seated passenger. The shaped surface is backed by and rests against the crush zone and is displaceable against that crush zone upon vehicular impact which accelerates the seated passenger against the supporting seat on which he or she resides. The back side of the crush zone is restrained from movement by an inflexible matrix of a rigid foam or the like; similarly a fixed backing plate can serve as such restraint.

In a further aspect of the invention, a head/neck restraint is provided which prevents the cervical spine from straightening on impact from a rear end collision. The head-neck restraint may be used in conjunction with the throracic-lumbar restraint or may be used independently or with thoracic-lumbar restraints other than those described for the present invention.

The head-neck restraint is adapted to hold the normal contour of the cervical lordosis on impact. The head-neck restraint comprises an outer surface covered with a foam or upholstered layer. The forward facing part of the outer surface has an upper portion for supporting the passenger's cranium and a lower portion projecting forward to conform to the passenger's normal cervical lordosis. This outer surface encases a correspondingly shaped energy-absorbing core body which provides the head-neck restraint the same characteristics of energy absorption as discussed for the thoracic-lumbar restraint.

In another embodiment of the head-neck restraint, the inner core body may comprise a blow-molded hollow body which during impact distorts inwardly to absorb impact energy from the accelerated passenger in the manner that has been discussed. The core can also be injection molded, e.g. of a plastic foam such as foamed polystyrene which partially collapses under imposed forces without substantial rebound but still maintains the essential cervical lordosis.

DESCRIPTION OF PREFERRED EMBODIMENTS

Figure 3:
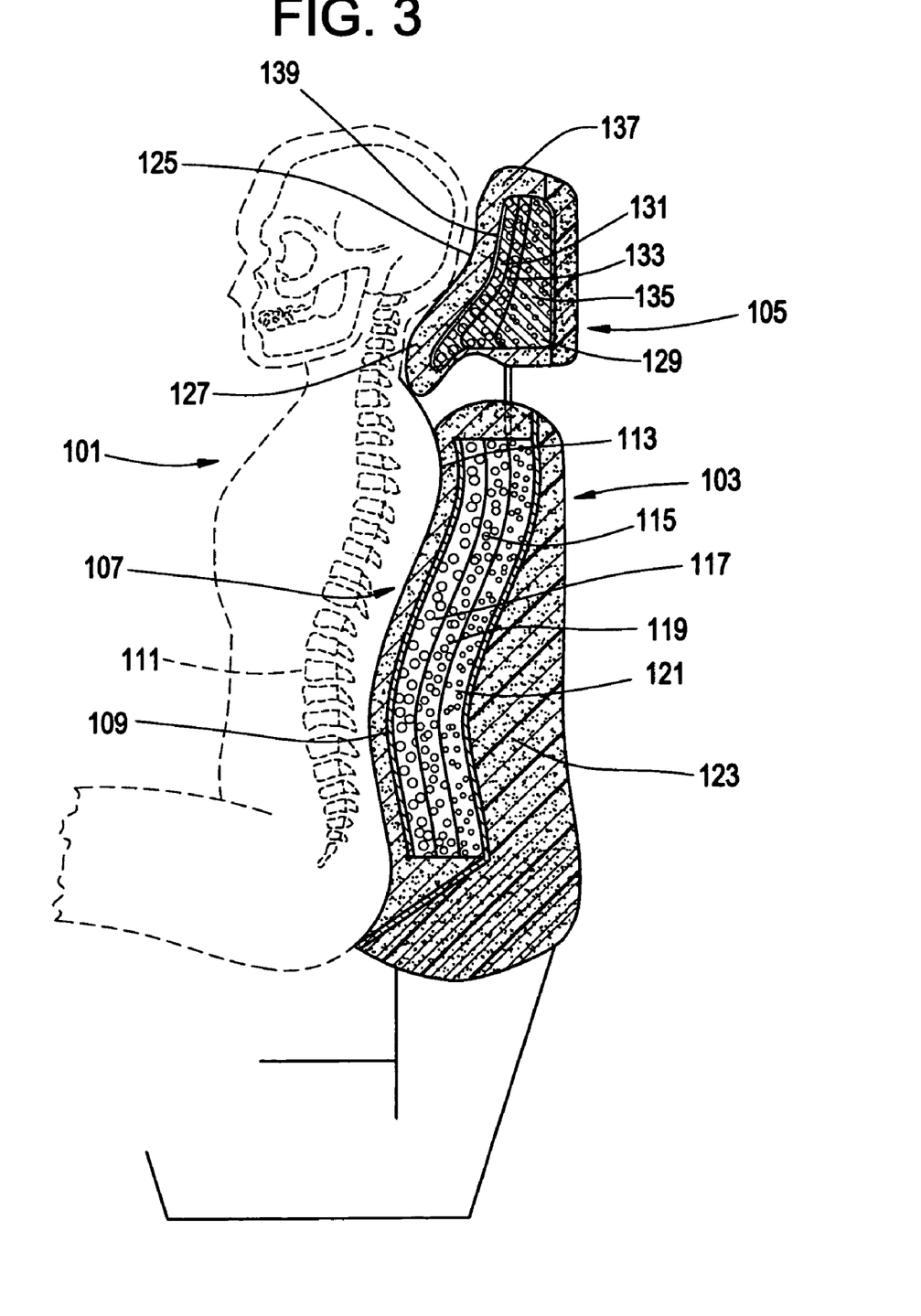
FIG. 3 is a simplified, schematic cross-section, illustrating a vehicular seat back in accordance with the present invention, which is shown in combination with a head-neck restraint pursuant to the invention.

In FIG. 3 a schematic cross-sectional view appears depicting a passenger 101 seated in a vehicle in which the passenger is rearwardly supported by a seat back generally designated at 103 and a head-neck restraint 105, each being in accordance with the present invention. Seat back 103 thus incorporates a thoracic-lumbar restraint 107 which includes a rigid plate 109, e.g. of a rigid plastic or metal, having a shape which substantially conforms to the thoracic-lumbar spinal portion 111 of passenger 101. Plate 109 is overlaid by a conventional comfort material 113 such as a soft foam or covered upholstery layer or the like against which the passenger actually rests. Directly behind plate 109 is an energy aborbing zone 115 consisting of a series of overlying layers 117, 119 and 121. In general terms these energy absorbing layers function in the manner disclosed in my aforementioned U.S. Pat. No. 5,580,124; i.e. upon a rear impact at the vehicle in which passenger 101 is seated, the passenger is accelerated rearwardly, driving rigid plate 109 against the zone 115. Zone 115 is in turn backed by a rigid material such as rigid foam 123 which holds the general shape for the zone 115 in conformance with plate 109. In accordance with the present invention however the zone 115 is specifically adapted so that the total energy absorbtion (from the kinetic energy transferred from the impact accelerated passenger) is at least 80%; and the coefficient of restitution for the crush zone material of zone 115 is between 0.05 and 0.4 with a preferable range being from 0.1 to 0.2. In the embodiment of FIG. 3 each layer of zone 115 comprises a compressible foam—e.g. of foamed plastic or the like; however the successive layers 117, 119, and 121 have increasingly small cells so that the energy absorptions differs from layer to successive layer to allow variation in the characteristics of the successive layers, and thereby enable on the average the boundary conditions in zone performance to be maintained over a range of impact conditions. The zone 115 can also be formed from a single layer of material, and is not limited to any specific number of layers—indeed the foam can have variable density in different volumes as may be required for the specific installation. The net effect of these boundary conditions, as has been shown from tests conducted at Wayne State University, is to yield the desired absorbtion of energy from the passenger, while avoiding substantial injury-generating recoil of the passenger.

The head-neck restraint 105 in FIG. 3 functions in conjunction with thoracic-lumbar restraint 107, while relying on somewhat different construction principles. The basic shape of restraint 105 is such that the forward facing portion of its external surface includes an upper part 125 against which the cranium of the passenger resides. Below this is a projecting part 127 which contacts the neck of the passenger and is shaped to substantially conform to the cervical lordosis of the seated passenger. The core body 129 of the head-neck restraint may in a first embodiment of the invention comprise an energy absorbing material of the same characteristics as has been disclosed for zone 115 in the thoracic lumbar restraint of FIG. 3. Thus as shown in FIG. 3, core body 129 can comprise overlying layers 131, 133 and 135 having the differing foam structures discussed for zone 115. The core body 129 is overlaid with a conventional covering 137 of a comfort foam, an upholstered material of batting and covering fabric, or the like. A rigid shaping member 139 can also be provided in overlying relation to the front surface of core body 129, to serve the same function as is described for plate 109 in FIG. 3.

Figure 4:
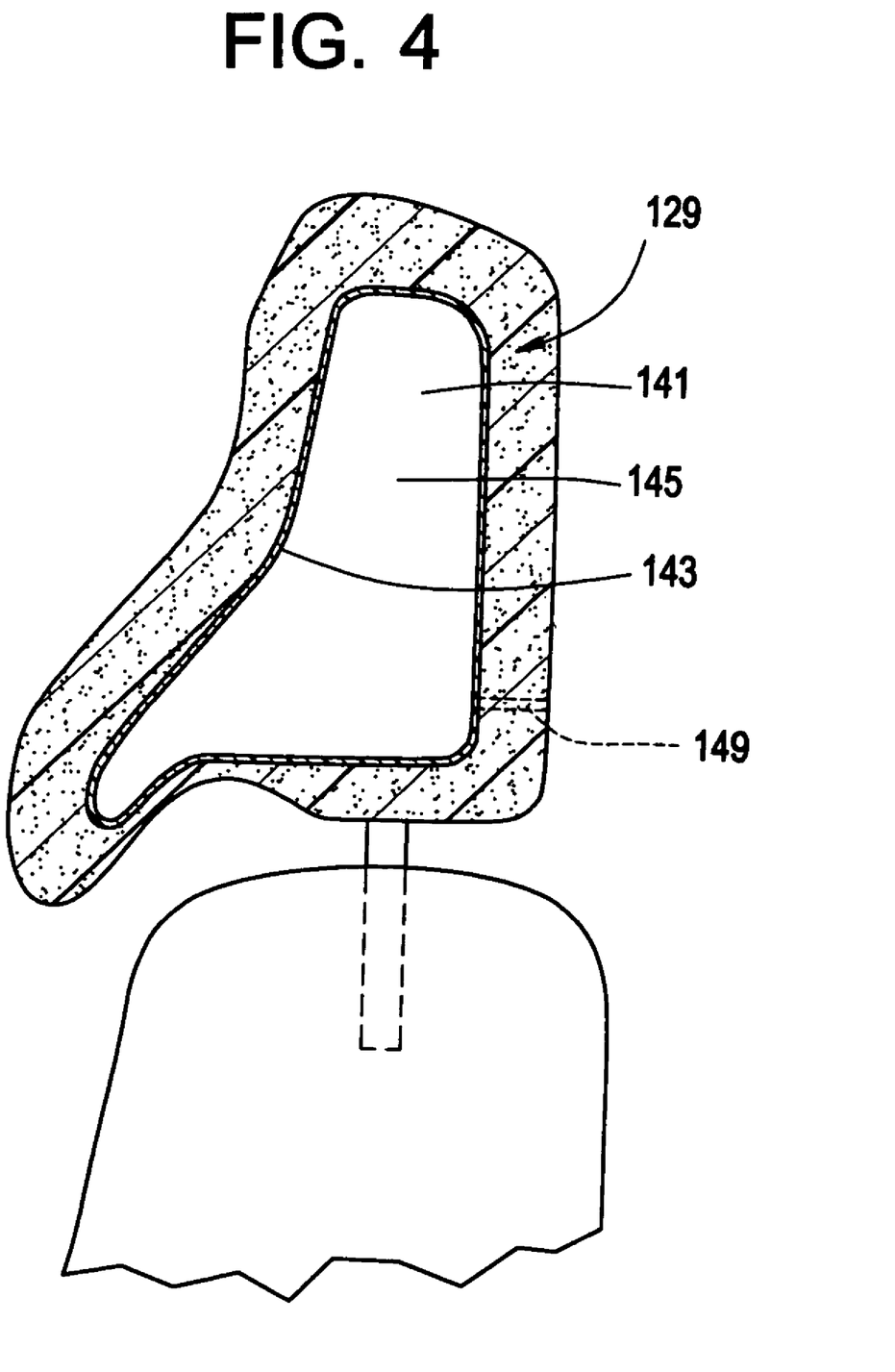
FIG. 4 is a partial schematic cross-section depicting a further embodiment of the head-neck restraint.

In a further embodiment of the head-neck restraint, as shown in FIG. 4, core body 129 may comprise a blow-molded plastic body 141, whereby the body is characterized by an external flexible surface 143 and a hollow interior 145 having a restricted passageway or vent 149 to ambient. Body 141 thus is analogous in its mechanical properties to blow molded beverage containers, such as a blow molded gallon milk container. Under impact forces the body 141 again acts as a crush zone by deforming inwardly in accordance with the impressed force pattern. As body 141 deforms the air from interior 145 exhausts through vent 149. the vent is sufficiently restricted that collapse is controlled so as to maintain the essential cervical lordosis of the seated passenger. There is no tendency for rapid rebound, but rather air will slowly reenter through vent 149 following its initial collapse, so that the body 141 is restored for subsequent use. Body 141 thus acts to absorb the impact energy transferred from the accelerated passenger, yet at a relatively slow controlled rate while still maintaining the essential cervical lordosis.

The core body 141 in addition to being hollow as shown in FIG. 4, can in a yet further embodiment be formed of an injection molded plastic foam such as a foamed polystyrene or the like. Such materials, depending on the density of the foam, can have differing collapse characteristics under imposed collision forces. The collapse of such foams is relatively slow and progressive, a characteristic desired in the present application, and moreover as has been discussed in connection with FIG. 4, such foams exhibit little or no rebound characteristics, whereby there is little tendency for the seated passenger to be subjected to injury generating recoil.

The thoracic/lumbar restraint and the head-neck restraint have been particularly illustrated as separate units, which can act conjunctively or can be used separately or with conventional units. It will be clear that the two types of restraints disclosed herein, can also be combined into a single integral restraint, i.e. into a restraint having an overall external appearance analogous to the showing of FIG. 1. In such event the various internal mechanical structures discussed for the present head-neck and thoracic/lumbar restraints can be used in desired combinations for the integrated unit.

While the present invention has been particularly described in terms of specific embodiments thereof, it will be understood that numerous variations upon the invention are now enabled to those skilled in the art, which variations yet reside within the scope of the present teaching. Accordingly, the invention is to be broadly construed and limited only by the scope and spirit of the claims now appended hereto.

What is claimed is:

1. Apparatus for preventing or limiting spinal injuries to a passenger seated in a forward facing position in a moving vehicle during vehicular impact or sudden deceleration, said apparatus comprising:

a vehicle-installed supporting seat for said passenger, said seat having a support portion behind the seated passenger which includes a resilient surface in contact with the supported passenger, said resilient portion being supported on an underlying stiff support shell;

said support shell being rearwardly displaceable upon being subjected to impressed forces generated from the said passenger pressing against the resilient surface of the support portion as a result of a rear end impact at said vehicle; and a controllably deformable energy absorbing crush zone being disposed to the rear of said shell as to be compressed by said rearward displacement of the shell; whereby said support portion acts to decelerate the supported spine of the passenger during a vehicle rear end impact, while the controlled deformation of said crush zone absorbs energy, to prevent or limit spinal injuries to the passenger; and said crush zone comprising a compressible foam having variable densities as a function of the front to rear depth in the foam, said foam being characterized in a rear end collision by exhibiting an absorption of the kinetic energy gained by the impact accelerated passenger of at least 80%; and the coefficient of restitution for the said crush zone material being in the range of 0.1 to 0.2.

2. Apparatus in accordance with claim 1 wherein the energy and coefficient of restitution are determined from testing standardized to a direct approximately 10 m.p.h. rear end impact at the vehicle in which the passenger is seated with the impacting test vehicle causing a peak acceleration at the struck vehicle of approximately 9 g; and assuming a passenger weight and height in the $50^{th}$ percentile of standard U.S. adult weight and height data.

3. Apparatus in accordance with claim 1, wherein said support portion is provided at least at a portion of said seat which lies behind the cervical spine of the seated passenger.

4. Apparatus in accordance with claim 1, wherein said support portion is provided at least at a portion of said seat which lies behind the thoracic and lumbar spine of a seated passenger.

5. Apparatus in accordance with claim 1, wherein said support portion is provided at least at a portion of said seat which lies behind the cranium and cervical spine of a seated passenger.

6. Apparatus in accordance with claim 1 wherein said foam comprises overlying layers of foams of differing densities.

7. Apparatus in accordance with claim 1 wherein said crush zone is sandwiched between said shell and a rigid backing having substantially the shape of said plate.

8. A seat-supported vehicular head neck restraint for limiting head and neck injuries to a passenger seated in a vehicle with the cranium of the passenger in proximity to said head restraint; comprising: a resilient surface for contact with the cranium of said passenger; and a controllably deformable energy absorbing crush zone underlying said resilient surface, the movement of said surface when said passenger's cranium is pressed against said surface during vehicular rear impact or sudden deceleration, being resisted by the controllably deformable crush zone, whereby the correspondingly controlled absorption of energy at the crush zone limits the magnitude of head and neck deceleration to limit head and neck injury; and wherein said crush zone material comprises a compressible foam formed by overlying layers of foams of differing densities, said foam being further characterized in a rear end collision by exhibiting a total energy absorption of the kinetic energy gained by the impact accelerated passenger of at least 80%; and the coefficient of restitution for the crush zone material being in the range of from 0.1 to 0.2.

9. Apparatus for preventing or limiting spinal injuries to a passenger seated in a forward facing position in a moving vehicle during vehicular impact or sudden deceleration, said apparatus comprising in combination:

(A). a thoracic-lumbar support comprising a vehicle-installed supporting seat for said passenger, said seat having a support portion behind the seated passenger which includes a resilient surface in contact with the supported passenger, said resilient portion being supported on an underlying stiff support shell;

said support shell being rearwardly displaceable upon being subjected to impressed forces generated from the said passenger pressing against the resilient surface of the support portion as a result of a rear end impact at said vehicle; and a controllably deformable energy absorbing crush zone being disposed to the rear of said shell as to be compressed by said rearward displacement of the shell; whereby said support portion acts to decelerate the supported spine of the passenger during a vehicle rear end impact, while the controlled deformation of said crush zone absorbs energy, to prevent or limit spinal injuries to the passenger;

and wherein said crush zone comprises a compressible foam formed by overlying layers of foams of differing densities, said foam being further characterized in a rear end collision by exhibiting a total energy absorption of the kinetic energy gained by the impact accelerated passenger of at least 80%; and the coefficient of restitution for the crush zone material being between 0.1 to 0.2; and (B). a seat-supported vehicular head and neck restraint for limiting head and neck injuries to said passenger seated in said vehicle with the head and neck of the passenger in proximity to said head restraint; comprising: a resilient surface for contact with the head and neck of said passenger; and a controllably deformable energy absorbing crush zone underlying said resilient surface, the movement of said surface when said passenger's head and neck are pressed against said surface during vehicular impact or sudden deceleration, being resisted by the controllably deformable crush zone, whereby the correspondingly controlled absorption of energy at the crush zone limits the magnitude of head and neck deceleration to limit head and neck injury; and wherein said crush zone comprises a compressible foam characterized in a rear end collision by exhibiting a total energy absorption of the kinetic energy gained by the impact accelerated passenger of at least 80%; and the coefficient of restitution for the crush zone material being in the range of from 0.1 to 0.2.

* * * * *